United States Patent
St. Mary

(10) Patent No.: US 8,291,587 B2
(45) Date of Patent: Oct. 23, 2012

(54) METHOD FOR FIELD MODIFICATION OF A DIESEL GENERATOR TO IMPROVE EFFICIENCY

(76) Inventor: Harvey K. St. Mary, Downey, CA (US)

( * ) Notice: Subject to any disclaimer, the term of this patent is extended or adjusted under 35 U.S.C. 154(b) by 1041 days.

(21) Appl. No.: 12/253,840

(22) Filed: Oct. 17, 2008

(65) Prior Publication Data

US 2010/0313418 A1    Dec. 16, 2010

Related U.S. Application Data

(60) Provisional application No. 60/999,505, filed on Oct. 18, 2007.

(51) Int. Cl.
*B23P 6/00* (2006.01)
*B21K 3/00* (2006.01)
*F02B 63/04* (2006.01)

(52) U.S. Cl. .......... 29/888.011; 29/888.01; 123/3

(58) Field of Classification Search ........... 29/888.011, 29/888.01; 123/2, 3
See application file for complete search history.

(56) References Cited

U.S. PATENT DOCUMENTS

| | | | |
|---|---|---|---|
| 7,607,289 B2 * | 10/2009 | Schmeichel et al. | 60/283 |
| 7,948,105 B2 * | 5/2011 | Agrawal et al. | 290/52 |
| 2005/0120715 A1 * | 6/2005 | Labrador | 60/618 |

* cited by examiner

*Primary Examiner* — Sarang Afzali
(74) *Attorney, Agent, or Firm* — Kenneth L. Green

(57) ABSTRACT

Apparatus and method for improving the fuel efficiency of a 10 kW Tactical Quiet Generator (10 kWTQG) diesel generator in the field. The apparatus includes a small turbocharger adapted to operate at very low boost and a low back pressure exhaust system. The turbocharger provides between approximately 0.5 and 3 pounds of boost over the 10 kWTQG normal operating range. No modifications are required to the 10 kWTQG fuel injection and governor system. The design of the low back pressure exhaust takes advantage of the narrow RPM range of the 10 kWTQG, and when combined with the turbocharger, meets or exceeds ambient noise level requirements. The apparatus is field installable by personnel of general skill levels present for operation of the 10 kWTQG.

18 Claims, 4 Drawing Sheets

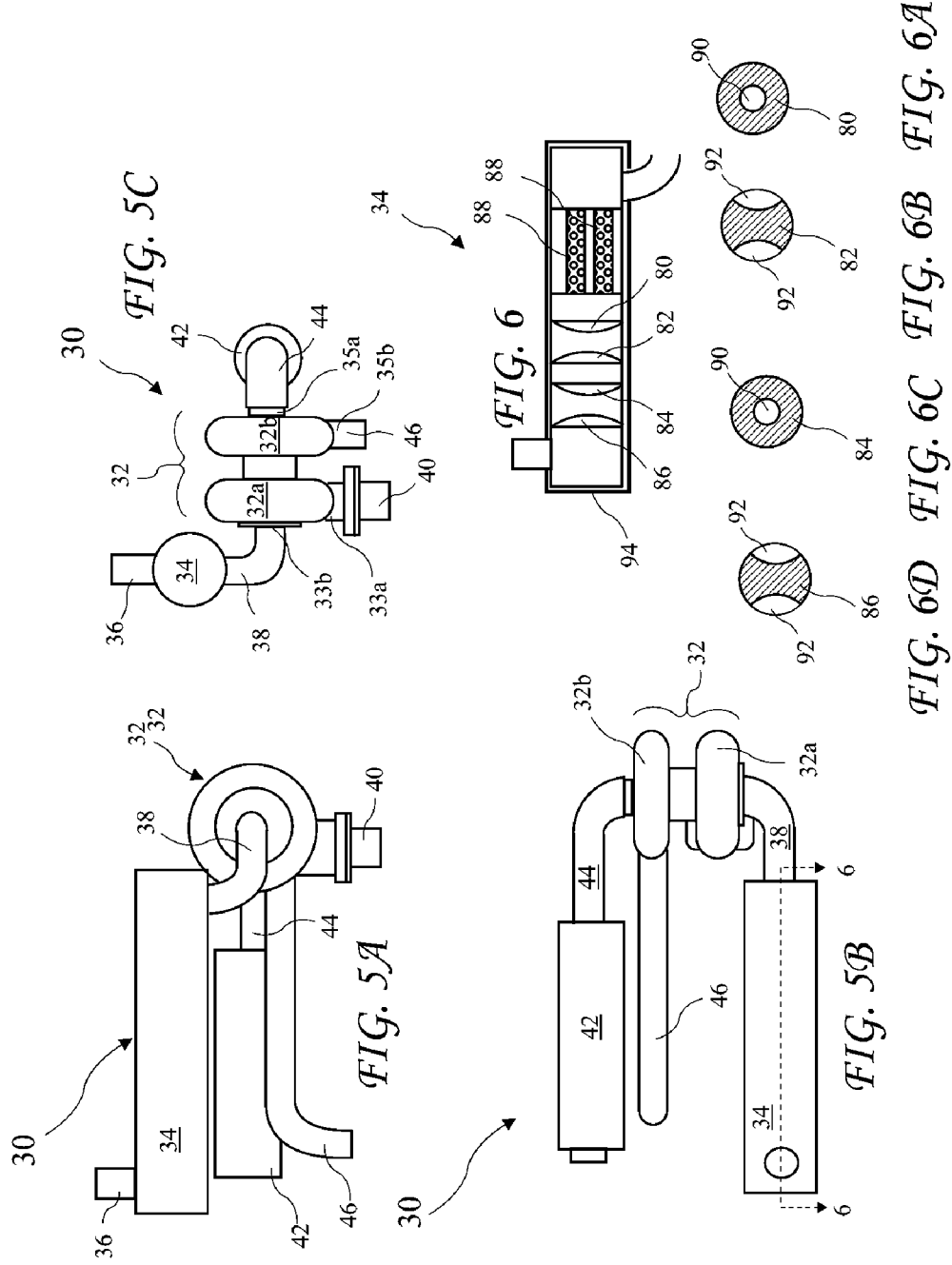

METHOD FOR FIELD MODIFICATION OF A DIESEL GENERATOR TO IMPROVE EFFICIENCY

The present application claims the priority of U.S. Provisional Patent Application Ser. No. 60/999,505 for "FUEL EFFICIENT GENERATOR SYSTEMS AND DEVICES" filed Oct. 18, 2007, which application is incorporated in its entirety herein by reference.

BACKGROUND OF THE INVENTION

The present invention relates to diesel generators and in particular to improving the fuel efficiency of a diesel generator in the field.

Diesel generators burn fuel to generate electrical energy in remote locations. For example, diesel generators are often used by the military to provide electrical power in the field. Such diesel generators may be used in a remote location, and the total cost of supply fuel for the generator often becomes very high due to the difficulty in transporting the fuel, especially in hostile conditions. A diesel generator commonly used by armed forces such as the United States Army is the 10 kW Tactical Quiet Generator (10 kWTQG), identified by US Army as TM 9-6115-642-10 by US Air Force as TO 35C2-3-455-11 by US Marine Corps as TM 09247/09248A-10/1, manufactured by various companies. The 10 kWTQG includes an in-line four cylinder diesel (fuel oil) engine having a 1.9 liter displacement. The engine can be configured to run on a fuel oil such as JP8 military fuel, diesel fuel, or other fuel oils.

The 10 kWTQG has been the subject of over 20 years of development, and throughout that period, efforts have been made to maximize the fuel efficiency of the 10 kWTQG. In the over 20 years of ongoing use and development of the 10 kwTQG diesel generator by its manufacturers and the Department of Defense, only nominal improvements in fuel efficiency have been attained. While a complete engine replacement could achieve the desired effect, such engine replacement is not capable of being performed in the field. Further, a replacement engine would not be compatible with existing parts and would require building a new spare parts inventory. At the time of the development of the present invention, there was an active effort by the Department of Defense to encourage the private development of technology that could increase the fuel economy of the 10 kwTQG and other military vehicles and generator sets.

Additionally, a wet stack problem associated with the 10 kwTQG diesel generator has been identified by the Department of Defense, wherein the diesel engine runs poorly when cold, producing large amounts of black smoke.

Therefore, while improvements have been made, there remains a need to further improve the efficiency of the 10 kWTQG to reduce fuel requirements. A further need exists for field modification which provides fuel efficiency improvements to the 10 kWTQG which may be implemented efficiently on location in the field and in war zones and only requires personnel with an available level of skill. An additional need exists to reduce or eliminate the wet stack problem.

BRIEF SUMMARY OF THE INVENTION

The present invention addresses the above and other needs by providing an apparatus and method for improving the fuel efficiency of a 10 kW Tactical Quiet Generator (10 kWTQG), without removing the generators from field locations where they have been deployed by, for example, the United States Army. The apparatus includes a small turbocharger adapted to operate at very low boost and a low back pressure exhaust system. The turbocharger provides between approximately 0.5 and 3 pounds of boost over the 10 kWTQG normal operating range. No modifications are required to the 10 kWTQG fuel injection or governor system. The design of the low back pressure exhaust takes advantage of the narrow RPM range of the 10 kWTQG, and when combined with the turbocharger, meets or exceeds the Army's sound level requirements. The present invention further address the wet stack problem of the 10 kWTQG. The apparatus of the present invention is field installable by standard personnel of skill levels necessary for general operation and maintenance of the 10 kWTQG.

In accordance with one aspect of the invention, there is provided a field modification kit for a 10 kWTQG. The field modification kit includes an oil lubricated and water cooled turbocharger optimized for low boost operation on the 1.9 liter diesel engine with no internal modifications operating at about 1,800 RPM, an improved air filter element for inside an air cleaner, a smooth air cleaner duct carrying fresh air from the air cleaner to the air inlet of the turbocharger; a smooth intake air duct carrying compressed air from the turbocharger to the intake manifold, an improved muffler, an exhaust duct carrying exhaust from the turbocharger to the muffler, coolant lines for providing engine coolant (usually water) from the diesel engine to the turbocharger and carrying the coolant from the turbocharger to the engine, and supplemental oil lines to carry oil from the diesel engine to the turbocharger and from the turbocharger to the crankcase pan of the diesel engine. Because the intake manifold is pressurized by the turbocharger, a crankcase ventilation system in the diesel engine, which originally was in fluid communication with the interior of the intake manifold, is modified to vent the crankcase to outside air. The field modification kit may include a header connecting the turbocharger to the exhaust manifold, or the turbocharger may be directly mounted to the exhaust manifold. The turbocharger is selected, adjusted, and/or modified to preferably provide a maximum of about four Pounds per Square Inch (PSI) boost and to more preferably provide a maximum of about three PSI boost. The boost is preferably limited by a waste gate and more preferably limited by a waste gate internal to the turbocharger. The improved air filter element provides higher air flow, traps smaller size particle, and has a larger volume of debris held before critical reduction in flow volume.

In accordance with another aspect of the invention, there is provided a method for on-location modification of the 10 kWTQG's diesel engine in the field using the field modification kit according to the present invention. The method includes steps of removing an original muffler from the diesel engine, remove an original air cleaner and ducting, mounting a turbocharger to the exhaust manifold, connecting a pressurized oil source to the turbocharger, connecting an oil drain line from the turbocharger to the diesel engine, connecting an intake air duct between the compressor section outlet of the turbocharger and an intake manifold, mounting an improved muffler to the diesel engine, connecting the improved muffler to the outlet of the turbine section of the turbocharger, and connecting the air cleaner having an improved air filter element to the inlet of the compressor section of the turbocharger. Additionally, when the turbocharger is water cooled, the method includes connecting a water line from the diesel engine to the turbocharger, and a return water line to the diesel engine cooling system. Also, mounting the turbocharger to the exhaust manifold may be either mounting the turbocharger directly to the exhaust manifold, or mounting a header pipe to the exhaust manifold and mounting the turbocharger to the header pipe.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 5A shows a front view of the field modification kit according to the present invention.

FIG. 5B shows a top view of the field modification kit according to the present invention.

FIG. 5C shows a side view of the field modification kit according to the present invention.

FIG. 6 is a cross-sectional view of a muffler according to the present invention of the field modification kit taken along line 6-6 of FIG. 5B.

FIG. 6A is a first baffle of the muffler.

FIG. 6B is a second baffle of the muffler.

FIG. 6C is a third baffle of the muffler.

FIG. 6D is a fourth baffle of the muffler.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 2:
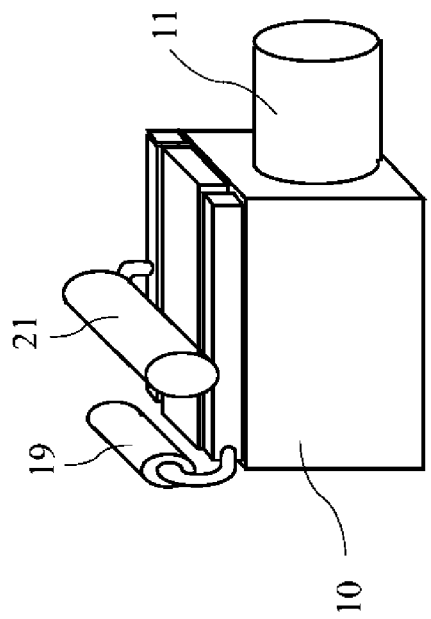
FIG. 2 is a side view of a prior art diesel engine and generator of the 10 kWTQG diesel generator.
Figure 1:
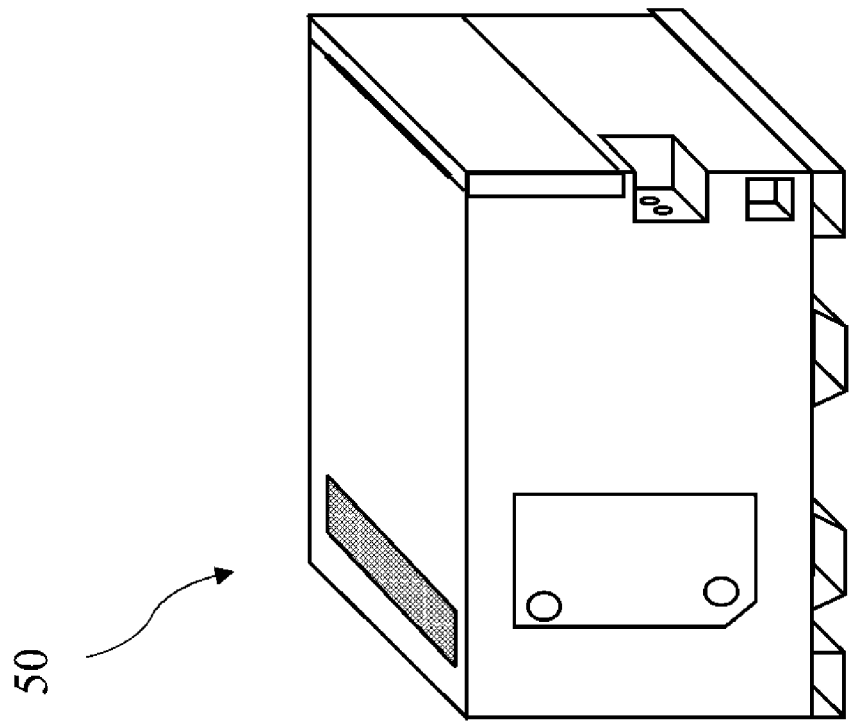
FIG. 1 is a 10 kW Tactical Quiet Generator (10 kWTQG) diesel generator.

A 10 kW Tactical Quiet Generator (10 kWTQG) diesel generator 50 is shown in FIG. 1 and the diesel engine 10 and generator 11 of the 10 kWTQG diesel generator 50 are shown in FIG. 2. There are ongoing efforts to improve the fuel efficiency of 10 kWTQG diesel generators 50 operated by armed forces of the United States and other branches of government, nations, organizations, and entities. A complete engine replacement could achieve the desired improvement, but such replacement is not capable of being performed in the field, and the new engines would not be compatible with existing parts inventories. Over twenty years of ongoing use and development of the 10 kWTQG by manufacturers and the Department of Defense, including specific efforts to reduce the 10 kWTQG's fuel consumption, have yielded negligible improvements in fuel economy. The present invention is the result of the inventors departing from conventional wisdom and exploring modifications which experts deemed bound to fail. As a result, it took almost two months to get the Army to begin testing a modified 10 kWTQG diesel generator 50, according to the present invention, once the first prototype was delivered. The uniqueness of the present invention is that it applies a totally counter-intuitive approach to improving efficiency, is installable in the field, and only requires changing a few external parts of the existing diesel engine.

Figure 3:
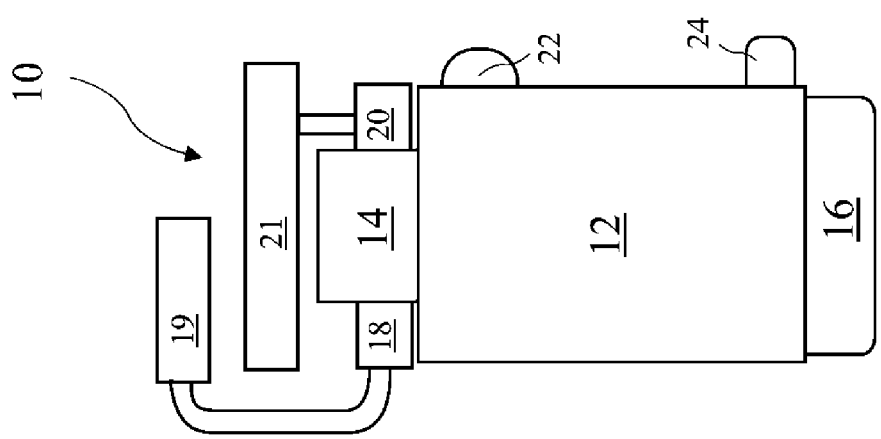
FIG. 3 is a front view of the prior art diesel engine used to power to the 10 kWTQG diesel generator.

The prior art diesel engine 10 is shown in FIG. 3. The diesel engine 10 includes a engine block 12, a crankcase pan 16, a cylinder head 14, an intake manifold 18, an air cleaner 19, an exhaust manifold 20, a muffler 21, a water pump 22, and an oil filter 24. The diesel engine 10 is naturally aspirated (i.e., not supercharged or turbocharged) and feeds air directly from the air cleaner 19 into the intake manifold 18.

Figure 4:
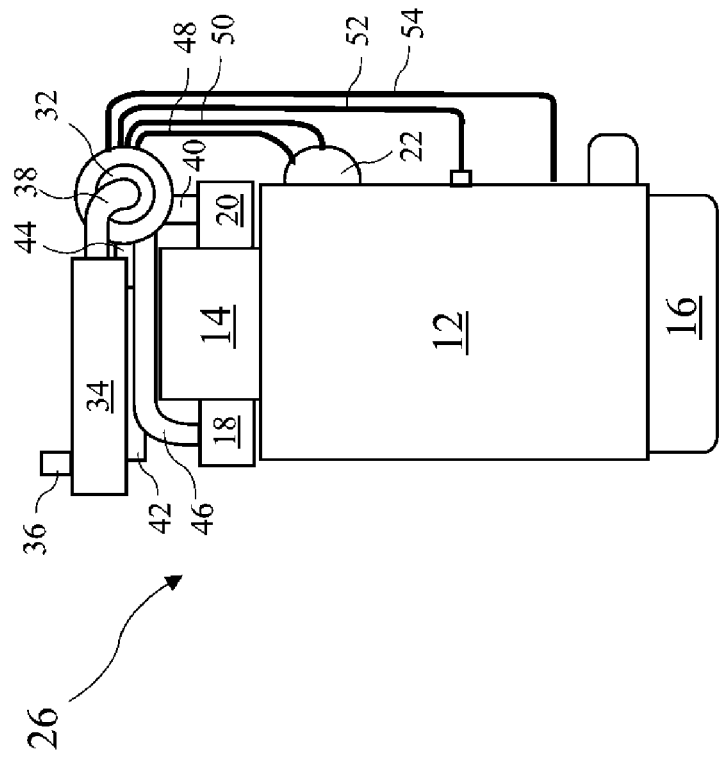
FIG. 4 is shows the diesel engine used to power the 10 kWTQG diesel generator in the field with a field modification kit installed according to the present invention.

A field modified diesel engine 26 according to the present invention is shown in FIG. 4. The modifications include mounting and/or connecting an input of a turbine (driven side) section 32a (see FIGS. 5B and 5C) of the turbocharger 32 to the exhaust manifold 20 and connecting an output of a compressor section 32b of the turbocharger 32 to the intake manifold 18. The modifications according to the present invention do not require any modifications to the rotating assembly, fuel system, and head (other than small modifications to redirect crankcase breathers from the now pressurized intake manifold to external filters) of the diesel engine 26 and as a result provide a field modification kit 30 (see FIGS. 5A, 5B, and 5C) which may be installed in the field by personnel normally present and does not require storing additional internal engine parts.

An example of a suitable turbocharger is a model number PTB-150-1200 manufactured by Precision Turbo in Hebron, Ind. A novel feature of the present invention is that the turbocharger 32 is limited to provide between about one half and three Pounds per Square Inch (PSI) of boost to the diesel engine 26. Commonly, turbocharged diesel engines operate at very high boost to obtain additional power, for example, between 18 PSI and 24 PSI boost. Unexpectedly, the diesel engine 26 provides improved fuel efficiency by operating in the boost range provided by the present invention without requiring any modifications to the head (other than to the breathes), valves, cam, combustion chambers, or fuel system and as a result provides a field modification kit which achieves a greater improvement in efficiency than obtained since the 10 kWTQG was first put into use by the Department of Defense over twenty years ago.

Continuing with FIG. 4, the turbocharger 32 is preferably an oil lubricated and water cooled turbocharger. The turbocharger 32 is connected to the water pump 22 by lines 48 and 50 to provide a flow of coolant to the turbocharger and to return the coolant to the engine cooling system. An oil line 52 connects a oil source on the engine to the turbocharger 32 and a drain line 54 allow the oil to return to the engine.

A front view of the field with a field modification kit 30 according to the present invention is shown in FIG. 5A, a top view of the field modification kit 30 is shown in FIG. 5B, and a side view of the field modification kit 30 is shown in FIG. 5C. Specifically, the elements of the field modification kit 30 for the 10 kWTQG 50 include:

an oil lubricated and water cooled turbocharger 32 selected for low boost operation on the 1.9 liter diesel engine, the 1.9 liter diesel engine having no internal modifications and operating at about 1,800 RPM;

an air cleaner 42 including a canister housing (the canister housing is preferably the original housing removed and reversed) and an improved air filter element providing higher air flow, smaller particle size trapped, and larger volume of debris held before critical reduction in flow volume. An example of a suitable air filter element is an eaau69 air filter element made by Amsoil in Superior, Wis.;

a smooth air cleaner duct 44 carrying fresh air from the air cleaner 42 to the air inlet of the turbocharger 32 (the duct 44 may be part of the air cleaner housing or a separate part);

a smooth intake air duct 46 carrying compressed air from the turbocharger 32 to the intake manifold 18;

an improved muffler 34:

an exhaust duct 38 carrying exhaust from the turbocharger 32 to the muffler 34 (the duct 38 may be part of the muffler 34);

coolant lines 48 and 50 for providing engine coolant (usually water or a water based coolant) from the diesel engine to the turbocharger 32 and carrying the coolant from the turbocharger 32 to the engine; and supplemental oil lines 52 and 54 to carry oil from the diesel engine to the turbocharger 32 and from the turbocharger 32 to the crankcase pan of the diesel engine. Optionally, a header 40 may connect the turbocharger 32 to the exhaust manifold 20 (in some instances the turbocharger 32 may be bolted directly to the exhaust manifold 20);

The turbocharger 32 includes a turbine section 32a with an inlet 33a connected to the header 40 (or the exhaust manifold 20) and an outlet 33b connected to the muffler 34 through the exhaust duct 38, and a compressor section 32b with an inlet 35a connected to the air cleaner duct 44 and an outlet 35b connected to the intake air duct 46. The inlet 33a of the turbine 32a may alternatively be connected (or mounted) directly to the exhaust manifold 20. The turbocharger 32 may be supported by the header 40, by the exhaust manifold 20, or by a separate bracket.

A cross-sectional view of the muffler 34 according to the present invention of the field modification kit 30 taken along line 6-6 of FIG. 5B is shown in FIG. 6, a first internal baffle 80 of the muffler 34 is shown in FIG. 6A, a second internal baffle 82 of the muffler 34 is shown in FIG. 6B, a third internal baffle 84 of the muffler 34 is shown in FIG. 6C, and a fourth internal baffle 86 of the muffler 34 is shown in FIG. 6D. The muffler 34 is a chambered muffler designed to take advantage of the normal operating RPM of the diesel engine 26 (i.e., a tuned muffler), and replaces the highly restrictive original muffler 21. The chambered muffler design includes a combination of the internal baffles 80, 82, 84, and 86, and diffuser tubes 88. The internal baffles 80, 82, 84, and 86 allow the exhaust gases to expand, thus reducing the noise generation of the muffler 34 and the diffuser tubes 88 can further reduce the noise generation of the diesel engine 26. Preferably, the first and third internal baffles 80 and 84 are solid disks with round passageways 90 in the centers, and the second and fourth internal baffles 82 and 86 are solid disks with arced cutout passageways 92 on opposite sides. The muffler 34 may further include baffled chambers having cross-sectional variation along the length of the muffler 34 from the muffler inlet to the muffler outlet to allow further expansion of the exhaust gases.

The field modification kit 30 may further include an insulation blanket 94 (see FIG. 6) configured to be positioned about the muffler 34. The insulation blanket 94 may include notches therein or apertures therethrough such that it can be wrapped tightly around the muffler 34. The insulation blanket 94 may also include fasteners such as straps, snaps, buttons, hook and loop fasteners, or other suitable fasteners to retain its position on the muffler 34. The insulation blanket 94 can further reduce the noise signature of the 10 kWTQG diesel generator 50 and may at least partially thermally isolate the 10 kWTQG diesel generator 50 components from the muffler 34 such that the muffler 34 does not substantially heat the adjacent components of the 10 kWTQG diesel generator 50.

Figure 7:
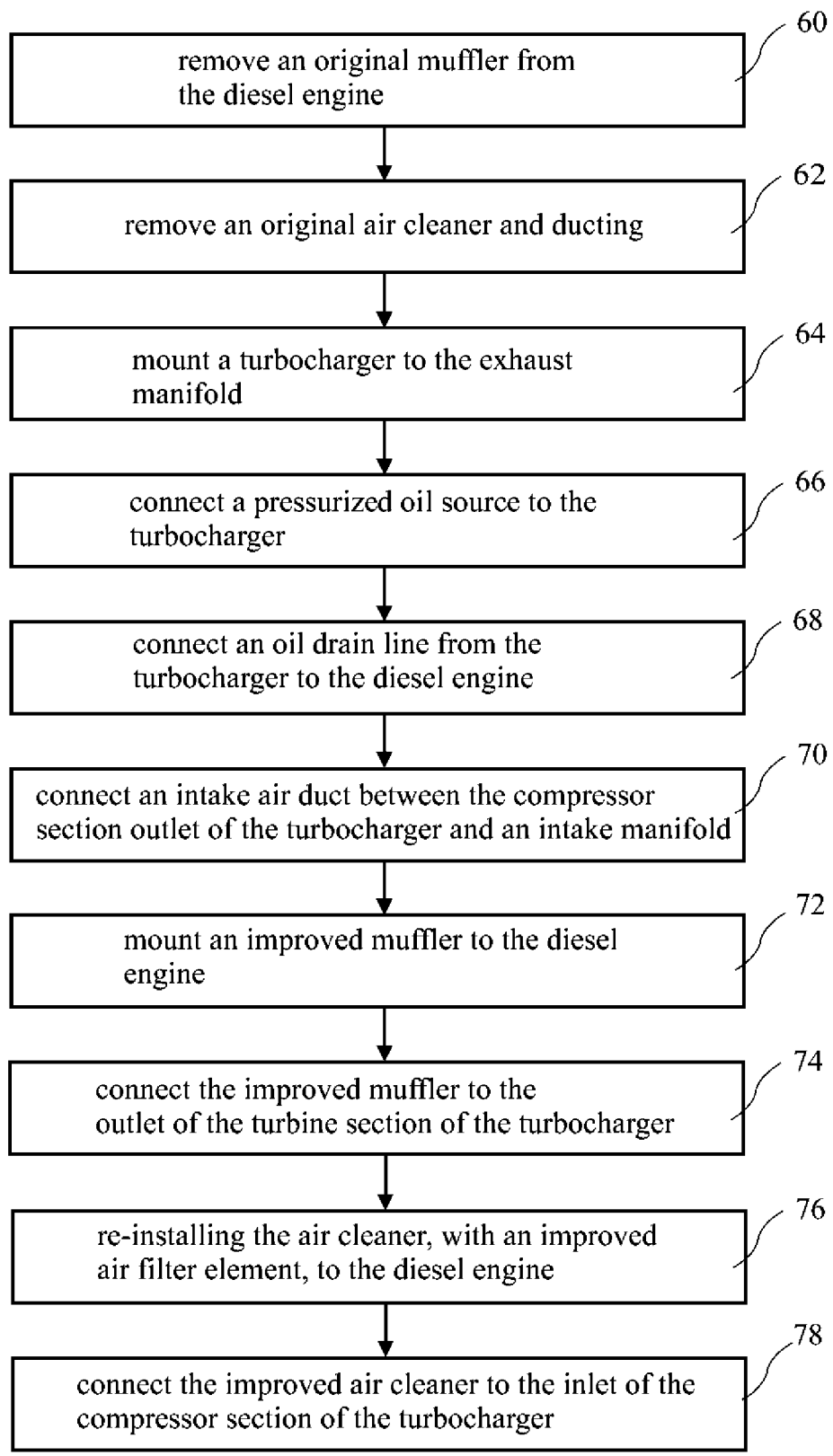
FIG. 7 is a method for field modification of the diesel engine used to power the 10 kWTQG diesel generator in the field using the field modification kit according to the present invention.

FIG. 7 is a method for field modification of the diesel engine used to power the 10 kWTQG diesel generator 50 (see FIG. 1) in the field using the field modification kit according to the present invention. The method includes steps of: removing an original muffler from the diesel engine at step 60; mounting a turbocharger to the exhaust manifold at step 64; connecting a pressurized oil source to the turbocharger at step 66; connecting an oil drain line from the turbocharger to the diesel engine at step 68; connecting an intake air duct between the compressor section outlet of the turbocharger and an intake manifold of the diesel engine at step 70; mounting an improved muffler to the diesel engine at step 72; connecting the improved muffler to the outlet of the turbine section of the turbocharger at step 74; and connecting an air cleaner to the inlet of the compressor section of the turbocharger at step 78.

The fuel efficiency of the diesel engine may be further improved by using an improved air filter. Therefore, the method preferably further includes removing an original air cleaner and ducting at step 62; re-installing the air cleaner, with an improved air filter element, on the diesel engine at step 76; and connecting the improved air cleaner to the inlet of the compressor section of the turbocharger at step 78.

Additionally, turbocharger life may be extended by using a water cooled turbocharger. When the turbocharger is water cooled, the method further includes connecting a water line from the diesel engine to the turbocharger, and a return water line to the diesel engine. Also, mounting the turbocharger to the exhaust manifold may be either mounting the turbocharger directly to the exhaust manifold, or mounting a header pipe to the exhaust manifold and mounting the turbocharger to the header pipe.

While the main utility of the present invention is improving the fuel efficiency of the 10 kWTQG diesel generator 50, the addition of the turbocharger 32 further allows the 10 kWTQG diesel generator 50 to operate under higher loads, and more importantly, at higher altitudes in thinner air. Also, the addition of the turbocharger allows the diesel engine to continue to operate on three cylinders. Further, while the present invention is described above in the context of the 10 kWTQG diesel generator 50, the apparatus and method are applicable to any similar diesel engine and the application of the present invention to any such similar diesel engine is intended to come within the scope of the present invention.

An additional step is to redirect crankcase breathers from the now pressurized intake manifold to breather filters external to the diesel engine and to replace hollow guides originally retaining the valve covers with solid guides to separate the crankcase ventilation from the pressurized air in the intake manifold.

While the invention herein disclosed has been described by means of specific embodiments and applications thereof, numerous modifications and variations could be made thereto by those skilled in the art without departing from the scope of the invention set forth in the claims.

I claim:

1. A method for field modification of a diesel engine used to power a 10 kW Tactical Quiet Generator (10 kWTQG) diesel generator in the field using a field modification kit, the method comprising:

removing an original muffler from an exhaust manifold of the diesel engine powering the 10 kWTQG diesel generator;

mounting a turbocharger to the exhaust manifold;

connecting a pressurized oil source from the diesel engine to the turbocharger;

connecting an oil drain line from the turbocharger to the diesel engine;

connecting an intake air duct between a compressor section outlet of the turbocharger and an intake manifold;

mounting a tuned muffler to the diesel engine;

connecting the tuned muffler to an outlet of a turbine section of the turbocharger; and connecting an air cleaner to a compressor section input of the turbocharger, wherein all of the steps are performed in the field at a location of use of the 10 kWTQG diesel generator.

2. The method of claim 1, further including limiting a turbocharger boost to a maximum of four pounds.

3. The method of claim 2, further including limiting the turbocharger boost to be between 0.5 and three pounds.

4. The method of claim 3, further including completing the method without modifying a fuel injection system of the diesel engine.

5. The method of claim 4, further including completing the method without modifying a governor of the diesel engine.

6. The method of claim 5, further including setting the turbocharger boost to about three PSI.

7. The method of claim 1, further including, setting up the turbocharger to have a maximum of about four PSI boost.

8. The method of claim 7, further including, setting up the turbocharger to have a maximum of about three PSI boost.

9. The method of claim 7, wherein setting up the turbocharger to have a maximum of about three PSI boost comprises selecting a waste gate to have a maximum of about three PSI boost.

10. The method of claim 9, wherein selecting a waste gate to have a maximum of about three PSI boost comprises selecting a waste gate internal to the turbocharger to have a maximum of about three PSI boost.

11. The method of claim 1, wherein mounting a turbocharger to the exhaust manifold comprises mounting an oil lubricated and water cooled turbocharger optimized for low boost operation on the 1.9 liter diesel engine with no internal modifications operating at about 1,800 RPM.

12. The method of claim 1, wherein mounting a tuned muffler to the diesel engine comprises mounting a low back pressure muffler to the diesel engine.

13. The method of claim 1, wherein connecting an air cleaner to a compressor section input of the turbocharger comprises removing an original air cleaner and air cleaner ducting; and replacing an original filter element inside the air cleaner with an improved filter element.

14. The method of claim 1, wherein all of the steps are performed in the field by personnel of general skill levels required for operation of the 10 kWTQG diesel generator.

15. The method of claim 1, wherein, if the turbocharger is water cooled, the method further includes:

connecting a water line from the diesel engine to the turbocharger; and connecting a return water line to the diesel engine or to a radiator.

16. The method of claim 1, wherein mounting a turbocharger to the exhaust manifold comprises mounting a turbocharger configured for a maximum of three Pounds per Square Inch (PSI) boost to the exhaust manifold.

17. A method for field modification of the diesel engine used to power the 10 kW Tactical Quiet Generator (10 kWTQG) diesel generator in the field using a field modification kit, the method comprising:

removing an original muffler from the diesel engine powering the 10 kWTQG diesel generator;

remove an original air cleaner and ducting from the diesel engine;

connecting an inlet of a turbine section of a turbocharger to an exhaust manifold of the diesel engine, the turbocharger configured for a maximum of approximately four PSI boost to the exhaust manifold;

connecting a pressurized oil source to the turbocharger for lubricating the turbocharger;

connecting an oil drain line from the turbocharger to the diesel engine;

connecting a first water line carrying coolant to the turbocharger for cooling the turbocharger; connecting a second water line carrying coolant from the turbocharger;

connecting an intake air duct between an outlet of a compressor section of the turbocharger and an intake manifold;

mounting a tuned muffler to the diesel engine;

connecting the tuned muffler to an outlet of a turbine section of the turbocharger;

replacing an original filter element inside the original air cleaner with an improved filter element; and connecting the original air cleaner with the improved filter element to an inlet of the compressor section of the turbocharger, wherein all of the steps of the method are performed in the field at a location of use by standard personnel of general skill levels related to the operation of the 10 kWTQG diesel generator.

18. A method for field modification of a diesel engine used to power a 10 kW Tactical Quiet Generator (10 kWTQG) diesel generator in the field using a field modification kit, the method comprising:

removing an original muffler from the diesel engine powering the 10 kWQG diesel generator;

mounting a turbocharger to the diesel engine without performing any internal modifications to the diesel engine;

limiting boost provided by the turbocharger to a maximum of four pounds;

connecting an intake air duct between a compressor section outlet of the turbocharger and an intake manifold;

mounting an improved muffler to the diesel engine, the muffler tuned for about 1,800 RPM;

connecting the tuned muffler to an outlet of a turbine section of the turbocharger;

connecting an air cleaner to a compressor section input of the turbocharger;

retaining an unmodified fuel injection system of the diesel engine; and retaining an unmodified governor of the diesel engine, wherein all of the steps are performed in the field at a location of use of the 10 kWTQG diesel generator.

* * * * *